United States Patent [19]

Takahashi

[11] 4,067,188

[45] Jan. 10, 1978

[54] HEAVY-DUTY OFFSHORE STUD CHAIN LINK

[75] Inventor: Soroku Takahashi, Tokyo, Japan

[73] Assignee: Kyuroku Kabushiki-Kaisha

[21] Appl. No.: 726,125

[22] Filed: Sept. 24, 1976

[30] Foreign Application Priority Data

Sept. 30, 1975 Japan .................................. 50-118688

[51] Int. Cl.$^2$ ......................... B21L 3/00; F16G 15/12
[52] U.S. Cl. ..................................... 59/35 CP; 59/31; 59/84; 219/52
[58] Field of Search ......................... 59/31, 35, 84, 90; 219/121 EM, 121 EB, 52, 51

[56] References Cited

U.S. PATENT DOCUMENTS

| | | | |
|---|---|---|---|
| 2,399,953 | 5/1946 | Temple | 59/35 |
| 2,439,522 | 4/1948 | Miller | 59/35 |
| 3,230,339 | 1/1966 | Opitz | 219/121 EM |
| 3,518,400 | 6/1970 | Gallivan | 219/121 EM |
| 3,763,345 | 10/1973 | Stohr | 219/121 EM |
| 3,794,807 | 2/1974 | Bailey | 219/121 EM |
| 3,969,949 | 7/1976 | Ohnishi | 59/31 |

Primary Examiner—C.W. Lanham
Assistant Examiner—Gene P. Crosby
Attorney, Agent, or Firm—Shlesinger, Fitzsimmons & Shlesinger

[57] ABSTRACT

A heavy-duty chain link which constitutes a chain for use with vessels and the like. The link is fitted with a stud across the center thereof, which tends to prevent stretching and kinking of the link. Heat sources such as electron beams and plasma arcs fusion weld the abutting of two ends of the link, and the stud is wedged at at least one of its ends to said link by means of roots of weld beads provided by the heat sources. Such wedges lie at a right angle with the axis of the link for most effectively preventing the stretching and kinking of the link when it is subjected to a heavy load. A method of making this kind of stud chain link is disclosed also.

6 Claims, 12 Drawing Figures

HEAVY-DUTY OFFSHORE STUD CHAIN LINK

This invention relates to a heavy-duty offshore stud chain link, and a method of making such stud chain links, and more specifically, heavy-duty stud chain links used with vessels, and with offshore oil-drilling rigs, mooring buoy projects and other various offshore facilities. Those links which constitute a chain for the moorage of such heavy objects as mentioned above have to be provided with extremely high tensile or breaking strength. In order to meet this provision, a link of this kind which is an oval or oblong having a circular section, is fitted with a stud across the center thereof, the stud tending to prevent stretching and kinking of the link under duty.

Heretofore, a stud chain link of this kind was manufactured by bending a heated steel rod into an oval link and having the ends thereof abut against each other, forcibly inserting a stud into the link across the center thereof, and welding said abutting ends by a flash butt welding method. This conventional method inevitably produces burrs around the welded ends, and brings about too widely extended heat-affected areas on the link. The burrs have to be removed with difficulties and with much consumption of labor and time. In addition, it is often required, for providing firm and positive joints between the link and stud, to have the link and stud subjected to a secondary flash butt welding to obtain a weld therebetween such as an overhead double "T" weld.

In the method made in accordance with the present invention, fusion welding of the two ends of a link bent into an oval, and the welding of a stud to the link are simultaneously made by subjecting the link with the stud across the center thereof to heat sources such as electron beams and plasma arcs which traverse the joints to be welded in specific directions and with specific depths. More particularly, in the present invention method, the heat sources, viz., electron beams for example, are directed onto the abutting two ends of a link so that their weld beads can have such depths which reach the abutting portion of a stud with said two ends of the link, whereby said two ends and the stud can be welded simultaneously and integrally to each other. In the present invention, further, the heat sources are directed, and transversed against said joints in such directions that metals in fusion by the heat sources flow towards gaps between the link and stud, if any. This is most advantageous when additional filler metals are fed into the gaps between the aforementioned two ends and between the link and the stud, before the fusion welding operation is made in accordance with the present invention.

Hence, it is a primary object of this invention to provide a method of making a stud chain link, in which simultaneous, integral and homogenous fusion welding between the two ends of the link and between the link and a stud is assured.

The invention shall be explained hereinunder more in detail with reference to the accompanying drawing, in which several preferred embodiments of this invention are illustrated.

Figure 1A:
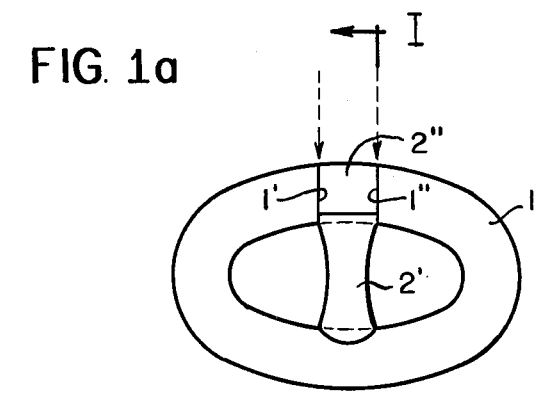
FIG. 1a is a front elevational view of a chain link bent into an oval and having its two ends confronting each other with a space therebetween, said space being fitted with the stem of a stud which extends across the center of the chain link.
Figure 1B:
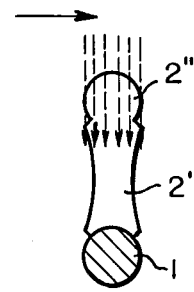
FIG. 1b is a cross sectional view taken along the line I—I in FIG. 1a looking in the direction of the arrows on line I—I, and wherein the directions of the weld beads are shown by arrows and dotted lines and the direction of movement of the beads is indicated by the arrow shown in solid line.
Figure 2A:
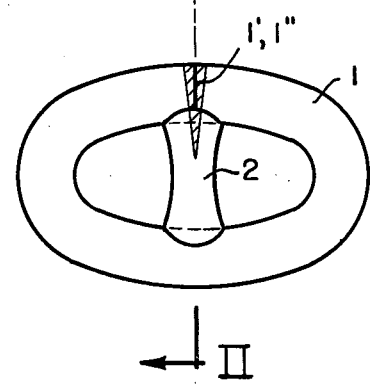
FIG. 2a and 2b are views generally similar to FIG. 1a and 1b, respectively, but illustrating a modified stud which has no stem and which is fitted to extend across the inner circumferential wall of the chain link at the center thereof.
Figure 2B:
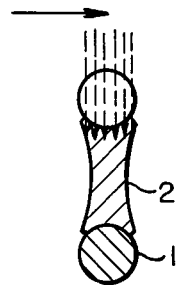
Figure 3A:
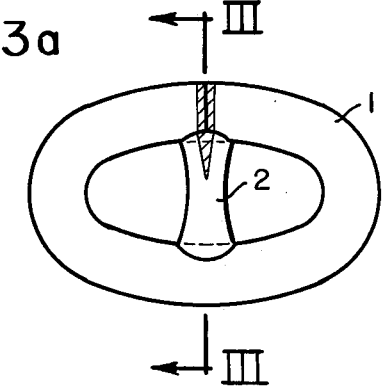
FIGS. 3a and 3b are views also generally similar to FIGS. 1a and 1b, respectively, but showing a method in which weld beads are applied to the link and stud laterally thereof and are moved from a position remote from the stud to a position adjacent to the stud.
Figure 3B:
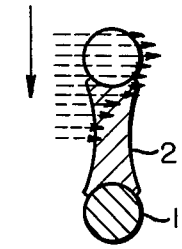
Figure 4A:
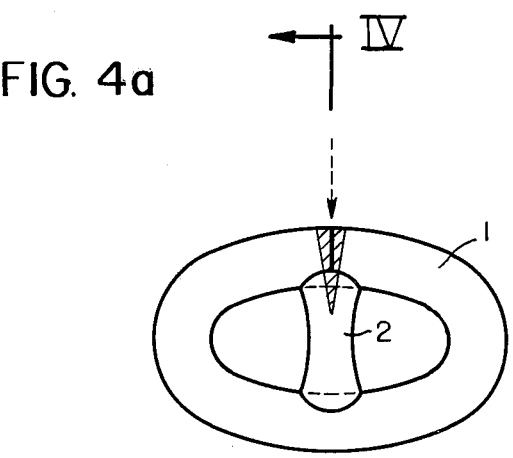
FIGS. 4a and 4b are also views generally similar to FIGS. 1a and 1b respectively, but showing a method in which weld beads are positioned in alignment with the abutting plane of the two ends of the link, and converge towards the axis of the stud.
Figure 4B:
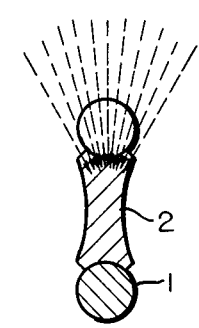
Figure 5A:
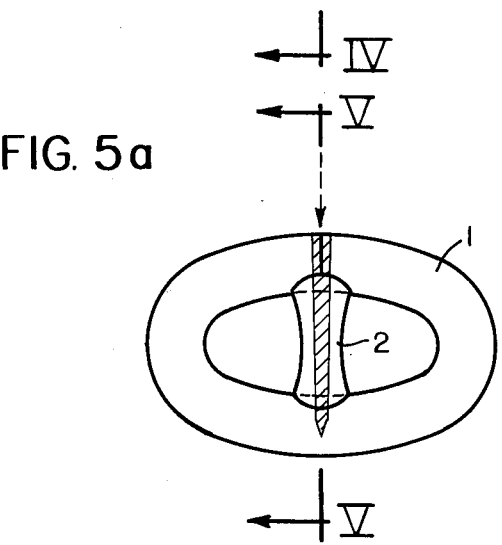
FIGS. 5a and 5b are views generally similar to FIGS. 1a and 1b, respectively, and show a method in which weld beads reach and go completely through a stud and the end thereof which is located opposite to the end which abuts against the abutting two ends of the link.
Figure 5B:
Figure 6:
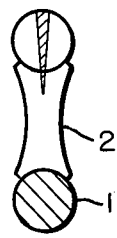
FIG. 6 is a view which schematically shows a method in which an electron beam penetrates through the link and towards the stud.
Figure 7:
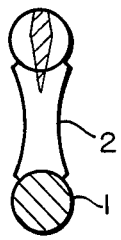
FIG. 7 is a view similar to FIG. 6, but represents a method in which the width of the beads of an electron beam is enlarged approximately at the center of the link.

A chain link 1 is made of a steel rod of a predetermined length which is heated and bent to an oval. Two ends 1', 1" of the link 1 may directly abut each other (FIGS. 2a, 3a, 4a and 5a), or confront each and have a stem 2" of a stud 2' positioned therebetween (FIG. 1a). In either case, a stud 2 or 2' extends across the center of the link so as to have the ends 1', 1" of the link positioned in alignment with the axis of the associated stud 2 or 2'. When a stud 2 having a length substantially equal to the inner diameter of the link 1 is inserted within the link, it is firmly supported mechanically by the link on account of the shrinkage of the link when it is cooled after having been heated. Then, along the one abutting plane of the ends 1', 1" of link 1 (in case of FIGS. 2 to 5), or along the two abutting planes at 1', 1" (in case of FIG. 1), electron beams are projected, as shown by dotted lines and their associated arrows in the drawing. The beams are successively moved in the directions shown by arrows represented by solid lines in FIGS. 1b, 2b, 3b, 4b and 5b in the drawing so as to cover substantial areas of the aforementioned abutting planes. Hatched parts in FIGS. 2, 3a, 4a and 5a shown fusion bonds or the heat-affected zones by weld beads. It shall be noted from these Figs. that weld beads shall have primarily such widths which are sufficient to fusion weld the abutting ends of the link, and also, though secondly, have such depths which are workable to weld the link and stud, keeping the heat-affected zone within the stud at a minimum. This is most prominent in case of the embodiment illustrated in FIG. 3a.

It shall be noted that as aforementioned, it is essential in this invention to have the two ends of the link welded by weld beads such as electron beams and plasma arcs, to provide such beads with roots which reach the stud, and to have the beads directed and moved in such directions that metals fused by the beads flow towards the stud. Though the scope of this invention is more specifically defined in the claims appended hereto, it is important that as weld wedges extending from the link into the stud are located on the plane coplanar with the abutting of the two ends of the link viz., at a right angle with the longitudinal axis of the link, they are most effective for preventing the stretching and kinking of the link when it is subjected to heavy duty which tends to stretch along its longitudinal axis.

Having thus described this invention what I claim is:

1. A heavy-duty stud chain link consisting of:
   a steel rod of a predetermined length bent to form a link having a central opening of oblong shape, said link having two ends which abut each other;
   a metal stud being insertedly fitted within the central opening of the link so as to extend transversely across the center thereof;
   the abutting edges formed by the two ends of the link overlying one end of said stud and being fusion welded together by a plurality of adjacent weld beads which run substantially parallel with each other, and are provided by a heat source of electron beams or plasma arcs; and
   said one end of said stud being secured to the link by means of roots of said weld beads, certain of which roots extend substantially parallel to each other with lacunae therebetween, and
   said weld beads extending from the link into the stud with said roots thereof being disposed within the outer peripheral surface of said stud, and substantially in a plane which is coplanar with the abutting ends of the link and substantially at a right angle with the axis of the link.

2. A stud chain link as claimed in claim 1, in which the weld beads extend laterally to the axis of the stud, and are equispaced from each other so that the beads substantially conform to the outer contour of the link.

3. A stud chain link as claimed in claim 1, in which the weld beads run transversely to the axis of the link and in a plane extending along the axis of the stud.

4. A stud chain link as claimed in claim 3, in which the weld beads extend throughout the stud along its axis.

5. A method of making a heavy-duty stud chain link which comprises:
   heating and bending a steel rod of a predetermined length into a chain link having two ends abutting each other in generally coplanar relation;
   forcibly inserting a stud transversely within the link opening while the link is heated, so as to have the axis of the stud in alignment with the abutment plane of the above-mentioned two ends;
   fusion welding the abutting surfaces of said two ends by intermittently subjecting them to a heat source of electron beams or plasma arcs thereby to fusion weld together said abutting surfaces with a plurality of closely spaced weld beads, and
   securing the stud to the link by roots of said weld beads, said beads and the roots thereof lying substantially parallel in a plane coplanar with the ends of said links and disposed at substantially a right angle with the axis of the link.

6. A method as claimed in claim 5, in which the weld beads are inclined in directions which radiate outwardly from the link axis and converge inwardly towards the stud, whereby the roots of the weld beads extend into the end of the stud adjacent the two abutting ends of the link, and at points radially inwardly of the outer peripheral surface of the stud.

* * * * *